United States Patent [19]

Scott

[11] Patent Number: 5,611,439
[45] Date of Patent: Mar. 18, 1997

[54] SHOCK-RESISTANT GUN RACK

[76] Inventor: Terrell L. Scott, P.O. Box 354, Harkers Island, N.C. 28531

[21] Appl. No.: 628,854

[22] Filed: Apr. 5, 1996

[51] Int. Cl.$^6$ .............................. A47F 7/00; B60R 7/14
[52] U.S. Cl. ............................................. 211/64; 224/913
[58] Field of Search .................... 211/64, 107, 105.5, 211/105.6, 94; 224/402, 913, 546; D6/552, 553; 206/315.11; 248/617

[56]  References Cited

U.S. PATENT DOCUMENTS

| | | | |
|---|---|---|---|
| 1,500,049 | 7/1924 | Brooks | 211/105.6 |
| 2,253,664 | 8/1941 | Vigo | 211/105.6 X |
| 2,545,251 | 3/1951 | Barettella | 211/105.6 |
| 2,690,893 | 10/1954 | Mokhiber | 248/154 X |
| 2,797,033 | 6/1957 | Rasbach | 224/913 X |
| 2,823,808 | 2/1958 | Hindi | 224/913 X |
| 2,991,040 | 7/1961 | Levy | 211/105.6 X |
| 3,074,674 | 1/1963 | Hill | 248/156 |
| 3,326,385 | 6/1967 | Pinkerton et al. | 224/913 X |
| 3,570,412 | 12/1968 | Holman | 211/105.6 X |
| 3,931,893 | 1/1976 | Elkins et al. | 224/402 X |
| 4,108,313 | 8/1978 | Bogar, Jr. | 211/64 |
| 4,398,690 | 8/1983 | Rutledge | 248/150 |
| 4,450,989 | 5/1984 | Bogar, Jr. | 224/546 X |
| 4,648,516 | 3/1987 | Elkins | 224/402 X |
| 4,776,471 | 10/1988 | Elkins | 211/64 |
| 4,915,273 | 4/1990 | Allen | 211/64 X |
| 5,524,772 | 6/1996 | Simmons | 224/913 X |

*Primary Examiner*—Ramon O. Ramirez
*Assistant Examiner*—Sandra S. Snapp
*Attorney, Agent, or Firm*—Rhodes, Coats & Bennett, LLP

[57]  ABSTRACT

A shock-resistant gun rack for holding guns. The gun rack includes a plurality of main support tubes. Each tube includes a movable carrier supported by a coil spring. Connected to the movable carrier is a generally U-shaped gun holder that is disposed exteriorly of the tube. In the event of a shock or impact, the U-shaped gun holder will move downwardly against the coil spring, compressing the same and in the process, absorbing the shock or impact. After such an impact, the coil spring will then bias push the carrier and connected holder to an upper position.

18 Claims, 3 Drawing Sheets

SHOCK-RESISTANT GUN RACK

FIELD OF THE INVENTION

The present invention relates to gun racks, and more particularly to a gun rack designed to be mounted in or on a vehicle and still more particularly to a gun rack design that includes shock absorbing capability.

BACKGROUND OF THE INVENTION

Gun racks are conventionally mounted in or on vehicles. Such conventional gun racks customarily include a pair of laterally spaced main frames with each main frame having a series of generally U-shaped supports secured thereto for receiving and holding a gun such as a shotgun or rifle.

A common problem associated with conventional gun racks is that the gun holders are not designed with shock-absorbing capabilities incorporated therein. Consequently, when the vehicle encounters a bump and there is a resulting shock or impact, it is not unusual for the gun holder to scar or scratch the gun or to impact against a scope secured to the gun and cause the scope to become misaligned. Moreover, such impact can cause the gun to be jarred from the gun rack or can even cause the gun to be accidentally discharged.

Today guns, particularly shotguns and rifles, are very expensive goods. Gun owners desire to protect their investment in such guns and desire to keep the guns from being scratched and damaged due to impact and shocks that are absorbed by the gun rack mounted in or on a vehicle.

SUMMARY AND OBJECTS OF THE INVENTION

The present invention deals with a gun rack designed to absorb shocks and impacts. Because of the shock-absorbing capability of the gun rack of the present invention, scratches and damage to guns supported by the gun rack will be minimized in cases where the vehicle impacts a bump, hole or other disturbance in the road.

The gun rack of the present invention includes a plurality of elongated tubes. Each tube includes at least one carrier block movably mounted within the tube and supported on a coil spring. A generally U-shaped holder is secured to the carrier block and disposed exteriorly of the elongated tube. In response to an impact, the U-shaped holder and a gun supported thereby will move downwardly against the pressure or force of the coil spring located in the elongated tube, thereby absorbing the shock or impact. Thus, the gun supported by the gun holder is not scratched or damaged to the extent that would occur if the gun rack had no shock-absorbing capability.

It is therefore an object of the present invention to provide a gun rack of the type designed to be mounted in or on a vehicle with shock-absorbing capabilities.

A further object of the present invention is to provide a gun rack of the character referred to above wherein the supports associated with the gun rack for holding and supporting a gun will move downwardly against the force of the spring in response to a shock or impact, thereby absorbing the shock or impact and minimizing any damage imparted to the gun supported.

A further object of the present invention is to provide a gun rack of the character referred to above that is relatively simple in design and easy to manufacture.

Another object of the present invention resides in the provision of a shock-absorbing gun rack of the character referred to above that is reliable.

Other objects and advantages of the present invention will become apparent and obvious from a study of the following description and the accompanying drawings, which are merely illustrative of such invention.

DETAILED DESCRIPTION OF THE INVENTION

Figure 1:
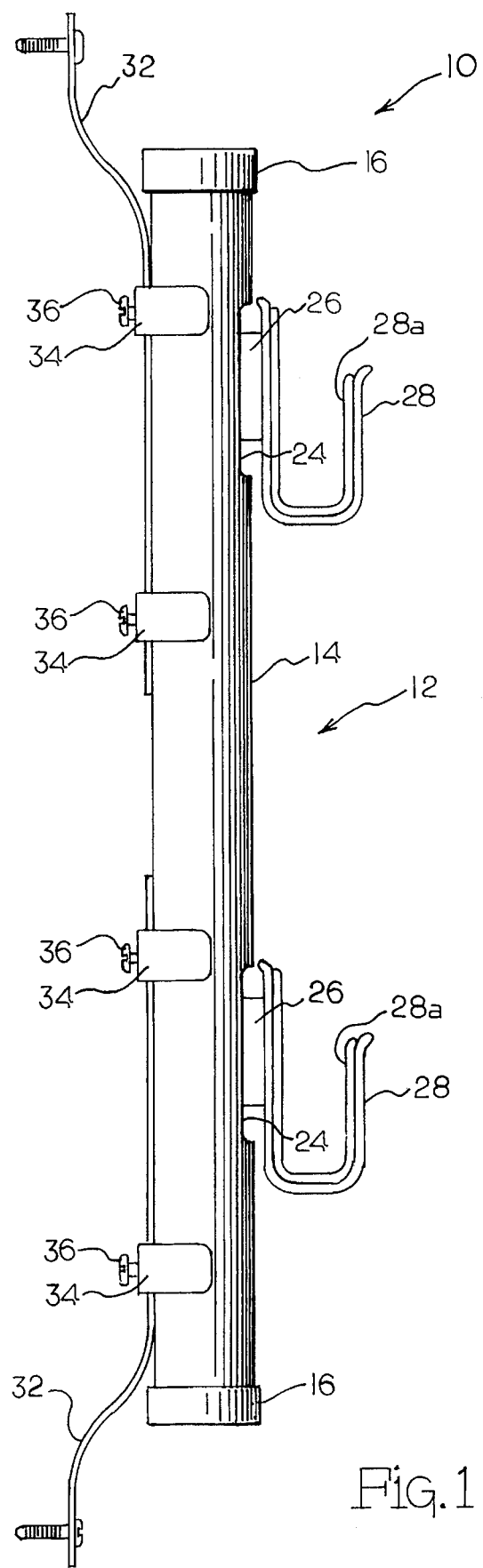
FIG. 1 is a side elevational view of the gun rack of the present invention.
Figure 2:
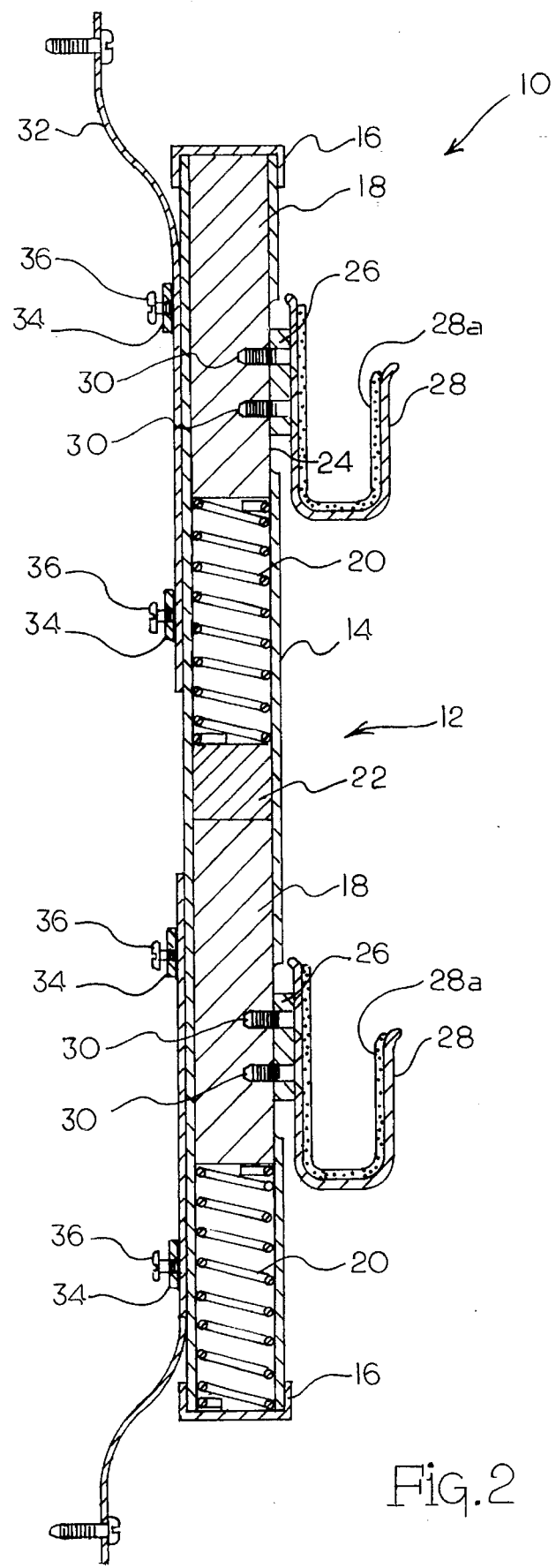
FIG. 2 is a sectional view of the gun rack.

With further reference no the drawings, the gun rack of the present invention is shown therein and indicated generally by the numeral 10. As discussed above, gun rack 10 is designed to absorb shocks and impacts. In particular, gun rack 10 is designed such that that portion of the gun rack that holds and supports the gun is capable of moving downwardly in response to a shock or impact.

Viewing the drawings in more detail, it is seen that the gun rack 10 includes an elongated frame indicated generally by the numeral 12. Frame 12 basically comprises an elongated hollow tube 14 that includes a pair of opposed caps 16. Although the tube 14 can be constructed of various types of materials, it is contemplated that one suitable material would be conventional PVC tubing.

In the case of the gun rack 10 disclosed herein, the elongated tube 14 includes a pair of movable carriers 18. As seen in the drawings, the movable carriers 18 are designed to move up and down within the elongated tube 14.

Disposed below each movable carrier is a coil spring 20. Note that coil spring 20 effectively supports a respective carrier 18 thereabove. Interposed between the upper coil spring 20 and the lower carrier 18 is a stop or support 22. The stop or support 22 is fixed within the elongated tube. Formed in the outer wall of the elongated tube 14 adjacent each carrier 18 is an elongated slot 24.

A spacer 26 is utilized to connect each carrier 18 with a gun holder 28. In particular, a pair of screws 30 engage the gun holder 28 and project through the spacer 26 into a respective carrier 18 so as to effectively secure the gun holder 28 to a respective carrier 18.

As seen in the drawings, the gun holder 10 of the present invention includes a pair of vertically spaced gun holders 28. As shown, each gun holder 28 is of a generally U-shape and consequently, is adapted to accept, receive and support a portion of a gun, such as the stock or barrel.

In a preferred design, the gun holder 28 is lined with a padding 28a such as a soft felt material or piece of rubber.

Now, turning to the mounting of the gun rack 10, it is appreciated that a pair of the frames 12 would be mounted in side-by-side relationship such that a pair of gun holders 28 would be horizontally aligned. In order to mount the gun rack 10 in or on a vehicle, each frame 12 is provided with an upper and lower bracket 32. Each bracket 32 is held in place on the frame 12 by a pair of shoulders 34 and an adjustable set screw 36. As seen in FIG. 1, each of the brackets 32 can be moved up and down and adjusted with respect to the frame 12. At the terminal end of each bracket 32 there is provided a screw that attaches directly to the vehicle or to a support structure associated with the vehicle.

Although the present disclosure discloses a coil spring 20 for absorbing shocks and impacts and for biasing the gun holder 28 to an upper position, it should be appreciated that other types of springs and biasing means can be employed for this purpose. In particular, the carriers 18 could be suspended by a spring, or in other cases elastic members such as rubber bands could be utilized for biasing the gun holder and absorbing shocks. In addition, it is appreciated that the frame or base structure 12 could be of various designs and could be constructed of various material.

Figure 3:
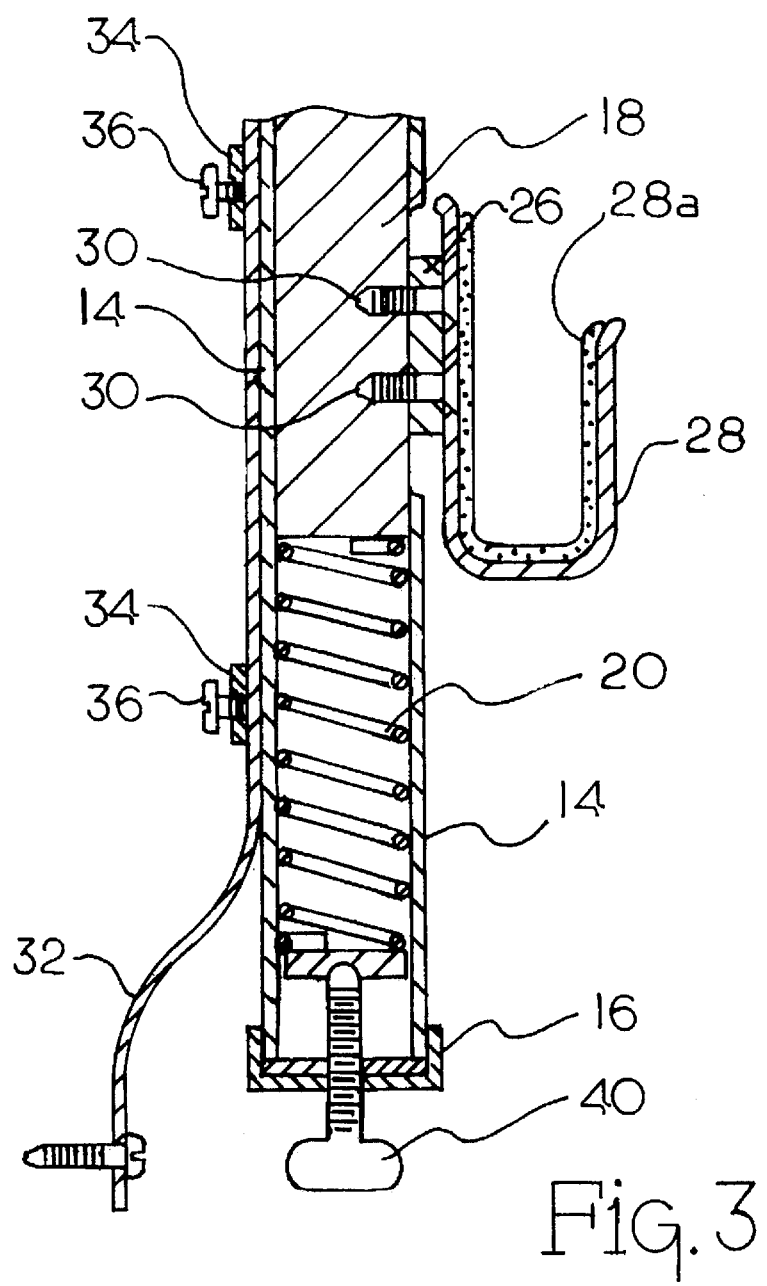
FIG. 3 is a fragmentary sectional view of the gun rack of the present invention showing a tension adjustment mechanism incorporated therein.

Now, turning to FIG. 3, the gun rack shown therein is provided with a tension adjustment mechanism. Most guns weigh approximately 7 to 7½ pounds. However, there are guns that are heavier due to bull barrel weight or extra features such as magnum weight. In the design of FIG. 3, there is provided a spring tension adjustment mechanism in the form of a set screw 40. This will compensate for variation in gun weight. By tightening the set screw 40, the adjacent coil spring 20 is compressed and accordingly, its spring characteristic or spring factor is changed. Thus, the set screw 40 enables one to compress or relax the adjacent coil spring 20. This will permit the owner of the gun holder of the present invention to properly adjust the coil spring 20 for the particular weight of a gun to be supported by the adjacent carrier 18.

In use, it is appreciated that at least a pair of the frames 12 would be disposed in side-by-side relationship and a gun such as a shotgun or rifle, would be supported in a pair of laterally spaced gun holders 28. In the case of an impact encountered by the vehicle, the weight of the gun itself will cause the respective gun holders 28 to move downwardly. This is because each gun holder 28 is fastened to a movable carrier 18 that is supported on and above a coil spring 20. The weight of the gun supported will cause the carrier 18 to move downwardly in response to an impact. The coil spring 20 will compress and once the shock or impact has been absorbed by the coil spring 20, then the coil spring will bias the carrier 18 and its associated gun holder 28 upwardly to its uppermost position. Thus, it is appreciated that each of the gun holders 28 will move up and down with respect to the elongated tube 14 in response to shocks and impacts. This will have the effect of protecting the gun being held and supported by the gun holders 28 and will in the end, minimize scratches and damage to the gun being supported and will also minimize the potential for scope misalignment occurring in response to such shock or impacts.

The present invention may, of course, be carried out in other specific ways than those herein set forth without parting from the spirit and essential characteristics of the invention. The present embodiments are, therefore, to be considered in all respects as illustrative and not restrictive, and all changes coming within the meaning and equivalency range of the appended Claims are intended to be embraced therein.

What is claimed is:

1. A shock-resistant gun rack for supporting a gun and moving vertically up and down in response to shocks or impacts, comprising: a frame; a gun holder movably mounted on the frame and movable vertically up and down with respect to the frame; the gun holder including a gun support structure that moves vertically up and down and extends underneath the gun and supports the gun from its bottom; and at least one spring operatively connected to the gun holder and the gun support structure thereof, the spring operative to bias the gun support structure that extends underneath the gun towards an upper position but yieldable in response to a shock or impact to allow the gun supporting structure and the gun carried thereby to move downwardly with respect to the frame so as to soften the impact, and wherein after moving downwardly the gun support structure is moved upwardly by the biasing action of the spring.

2. The gun rack of claim 1 wherein the spring comprises a coil spring.

3. The gun rack of claim 2 wherein the gun holder includes a movable carrier and wherein the coil spring engages a portion of the movable carrier.

4. The gun rack of claim 3 wherein the carrier is movable up and down with respect to the frame and wherein the coil spring engages the carrier and urges the carrier towards an upper position.

5. The gun rack of claim 4 wherein the frame includes an elongated tube and wherein the carrier and coil spring are confined within the elongated tube and wherein there is provided a support for supporting the coil spring.

6. The gun rack of claim 1 including a spring tensioning adjustment mechanism incorporated therein for engaging the spring and adjusting the spring characteristics of the same.

7. The gun rack of claim 6 wherein the spring tensioning adjustment mechanism includes a set screw for engaging the spring and either compressing the spring or relaxing the spring.

8. A shock-resistant gun rack comprising: a frame including an elongated tube; a gun holder movably mounted for up and down movement with respect to the frame; the gun holder including a carrier movably confined within the elongated tube and movable up and down therein; a coil spring mounted on a support within the elongated tube and wherein the coil spring engages the carrier and urges the carrier upwardly towards and upper position.

9. The gun rack of claim 8 wherein there is provided an elongated slot formed in the tube that forms the frame and wherein the gun holder includes a holding structure for receiving a gun and wherein the holding structure is disposed exteriorly of the elongated tube and is operatively connected to the carrier within the tube such that as the holding structure moves up and down with respect to the frame, the carrier also moves up and down.

10. The gun rack of claim 9 wherein there is provided a pair of vertically spaced gun holders secured on the frame.

11. A shock-resistant gun rack, comprising:

a) an elongated tube;

b) a carrier movably mounted within the elongated tube and movable up and down therein;

c) a coil spring confined within the elongated tube and positioned below the carrier, the coil spring engaging a lower portion of the carrier and supporting the carrier within the elongated tube;

d) a support disposed below the coil spring within the elongated tube for supporting the coil spring within the elongated tube;

e) an elongated slot formed in the elongated tube adjacent the carrier;

f) a gun holder secured to the carrier through the elongated slot formed in the tube and wherein the gun holder lies exteriorly of the tube and is movable up and down adjacent the tube; and g) wherein the coil spring biases the carrier and gun holder to an upper position and also permits the carrier and gun holder to move downwardly against the spring, causing the spring to compress in response to the gun holder being exposed to a shock.

12. The gun rack of claim 11 wherein the gun holder comprises a generally U-shaped support bracket.

13. The gun rack of claim 12 wherein there is provided at least one fastener that extends between the gun holder and the carrier, with the fastener extending through the elongated slot formed in the tube.

14. The gun rack of claim 11 wherein there is provided a spacer between the carrier and the gun holder and wherein the spacer is aligned with the elongated slot formed in the tube.

15. The gun rack of claim 11 wherein the same comprises at least two elongated tubes adapted to be disposed in side-by-side relationship such that the respective gun holders of the elongated tube would assume a generally horizontally aligned position.

16. The gun rack of claim 11 wherein the elongated tube includes a pair of spaced apart carriers, a pair of spaced apart coil springs, and a pair of spaced apart gun holders.

17. The gun rack of claim 11 including a spring tensioning adjustment mechanism incorporated therein.

18. The gun rack of claim 17 wherein the spring tensioning adjustment mechanism includes a set screw type adjustment device that is designed to engage at least one coil spring for compressing the coil spring or relaxing the coil spring.

* * * * *